Dec. 6, 1966   H. U. BLACKWOOD   3,289,772
PLOW WITH ADJUSTABLE AND REPLACEABLE ELEMENTS
Filed Nov. 16, 1964
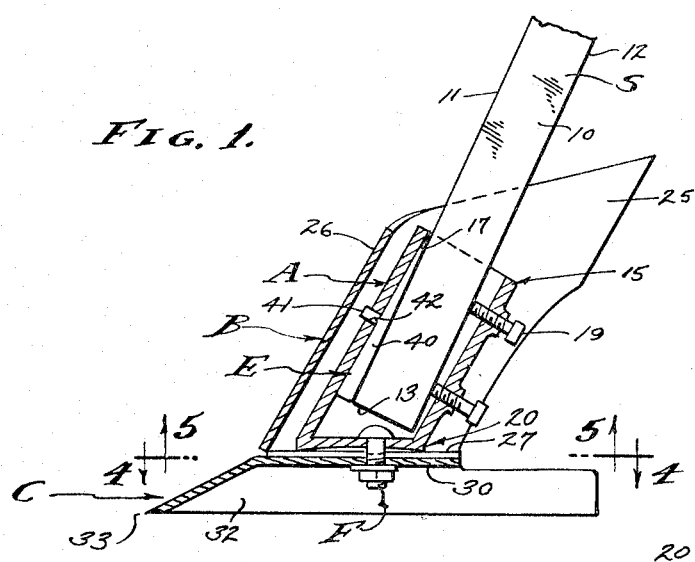
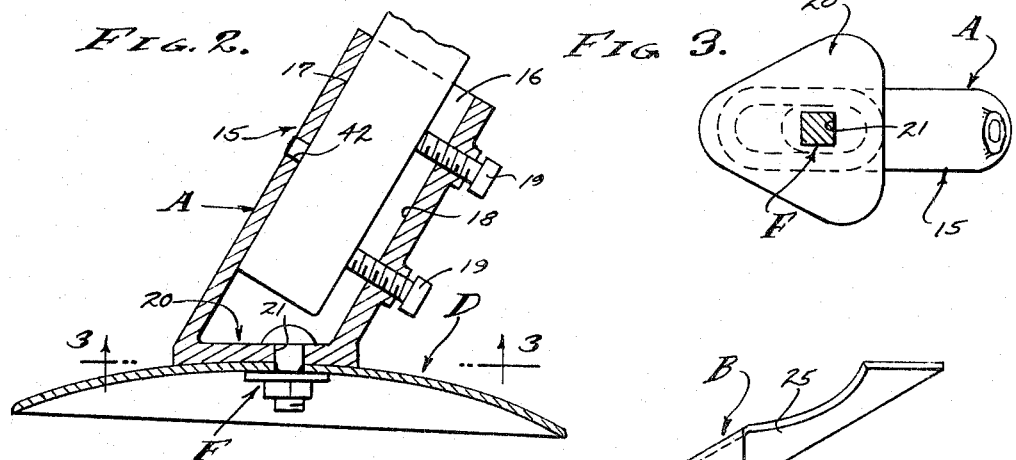
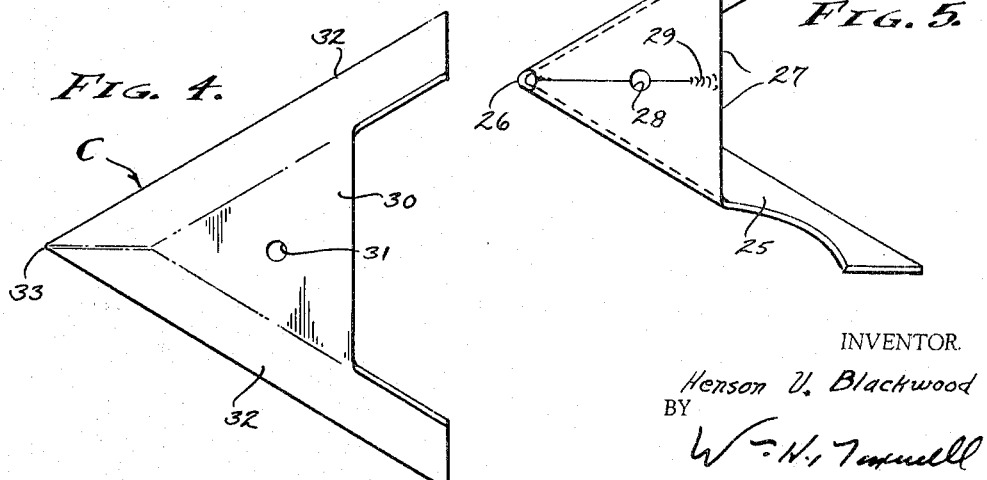
INVENTOR.
Henson U. Blackwood
BY
W. H. Trammell
Agent

United States Patent Office 3,289,772
Patented Dec. 6, 1966

3,289,772
PLOW WITH ADJUSTABLE AND REPLACEABLE
ELEMENTS
Henson U. Blackwood, 830 S. Fairfax Road,
Bakersfield, Calif.
Filed Nov. 16, 1964, Ser. No. 411,356
4 Claims. (Cl. 172—251)

This invention relates to a plow (or plough) as is used to cut, lift, invert and to pulverize soil, and it relates to any device operating like a plow to trench and/or till the soil, it being a general object of this invention to provide an earth handling implement in the form of a plow which is readily adjusted and which has easily replaceable parts, any of which parts can be readily replaced with a minimum of effort.

The plow can vary widely in its entirety and it is the active elements of a plow with which the present invention is primarily concerned. Therefore, I will limit this disclosure to those parts of a plow which are essential to the active elements, namely the plowshare and moldboard that are mounted onto a shank by means of a boot-like element in the form of an adjustable adapter. It is to be understood that equivalent parts can be mounted onto the shank by means of the boot-like adapter which is adjustable and which characterizes the present invention.

It is an object of this invention to provide a combination of separately replaceable elements that form a plow, wherein the moldboard can be included at will, wherein the plowshare is replaceable by itself whether or not it is used in combination with the moldboard, and is also replaceable with a disc if and when this is desirable.

It is another object of this invention to provide a plow structure that is adjustably carried on a bar or shank, whereby the angular disposition thereof can be either increased or decreased as circumstances require.

It is also an object of this invention to provide both plowshare and moldboard constructions that are easily manufactured and which are rugged and reliable when in use. Also, it is an object to provide a construction wherein the faster wearing plowshare is replaceable with or without replacement of or disturbance of the moldboard mounting, so that parts are replaceable as circumstances require.

The various objects and features of this invention will be fully understood from the following detailed description of the typical preferred forms and applications thereof, through which description reference is made to the accompanying drawings, in which:

FIG. 1 is an elevational sectional view of the plow of the present invention, showing the replaceable elements thereof.

FIG. 2 is an enlarged view similar to FIG. 1 showing certain elements of the plow removed and replaced with another equivalent element.

FIG. 3 is a sectional view taken as indicated by line 3—3 on FIG. 2.

FIGS. 4 and 5 are sectional views taken as indicated by lines 4—4 and 5—5 on FIG. 1.

The replaceable elements of the present invention are attached to a depending shank S that is rigidly advanced through the soil at a substantially constant angle of inclination as shown in FIG. 1. In FIG. 1 I have shown the preferred form of the invention which comprises generally an adapter A, a moldboard B, a plowshare C adjustment means E and means F securing the combination together in working condition. In FIG. 2 I have shown a modification wherein the disc D is substituted for the soil tilling elements shown in FIG. 1. Thus, the adapter A is utilized to adjustably mount various soil-tilling implements upon the shank S, all as hereinafter described.

The shank S is a rigid bar that depends from a beam or the like (not shown) according to usual practice. The shank S is rectangular in cross-section, having parallel sides 10 and parallel front and rear edges 11 and 12. The shank S ordinarily terminates in an end 13 normal to the sides and edges, as shown.

The adapter A characterizes the present invention and is a boot-like part and may be referred to as a boot, having that appearance. The said adapter A can be fabricated in various ways, either of separate parts that are fitted and secured together as by welding, or as a casting. In any case, the adapter A has a body 15 that engages on or over the shank S and it has a foot 20 that receives and positions the soil tilling elements involving the moldboard, plowshare and disc, or any other like soil tilling implement.

The body 15 is preferably tubular in form, having sides 16 to slidably receive the sides of the shank, and having edges 17 and 18 to slidably receive the edges of the shank. In accordance with the invention the front edge 17 which opposes the leading edge 11 of the shank S is spaced from and confronts said edge 11. Further, the front edge 17 is parallel to the leading edge 11 when the rear edge 18 and trailing edge 12 are slidably engaged. The body 15 is of substantial length or height, whereby a good purchase is established upon the shank S, the body being secured in position on the shank as by means of one or more set screws 19 or the like, threaded through the body 15 at edge 18 and spaced as shown.

The adjustment means E is provided for selective angular disposition of the assembly of parts at the lower terminal end portion of the shank S. The desired adjustment is effected by selective use of the adjustment means E which involves a taper or wedge 40 that is adapted to occupy the space between the confronting edge 17 and edge 11. In practice, the angle of the wedge is not extreme, say for example 5°, in which case it increases the vertical disposition of the active plow element by 5° when inserted with its small end downward and it decreases the vertical disposition by 5° when inserted reversely (as shown). Thus, the active plow elements can be adjusted from the normal intermediate position as shown in FIG. 2, permitting the selection of three positions. Further, and in order to lock the wedge 40 in position between the confronting edges 17 and 11, there is a pin 41 at one edge of the wedge 40 and which enters a registering opening 42 in the boot body 15. As shown, the pin 41 and opening 42 are centered, whereby said wedge 40 is reversible and is also keyed in working position.

The foot 20 is a substantially flat plate-like part that closes the bottom end of the body 15 and it has a central opening 21 that accommodates the fastener of means F to be described. Since the shank A is commonly inclined as shown, the foot 20 is angularly related to the body 15, to the end that the said foot is substantially horizontal. In accordance with the invention, the foot 20 is both concaved and it is triangular in plan configuration. That is, the foot 20 is dished upwardly toward its center, and one of its three corners is placed forwardly, each corner being rounded. The said dished configuration has particular utility in biting into the parts that are assembled with the adapter, and to the end that they do not turn relative to each other once they are clamped together.

The moldboard B is preferably fabricated of sheet metal folded into two flared cheek portions 25 that extend rearwardly from a folded front edge 26. The lower margins 27 of each cheek portion 25 are turned inward so as to engage and/or to be in abutment at the center of the structure, whereby a flat plate is formed through which an opening 28 is formed to receive the fastener of means F. Welding 29 can be employed to join the margins 27.

The plowshare C is preferably fabricated of sheet metal formed to depend from the moldboard and to form a continuation thereof. The plowshare C has a flat plate 30 of substantially the same configuration as the plate formed by the inturned margins 27 of the moldboard, these plates or plate-like parts being flat. Further, the plate-like parts being flat. Further, the plate 30 has an opening 31 centrally located therethrough to pass the fastener of the means F. The divergent depending sides 32 of the plowshare converge at the point 33 of the implement.

Upon assembly, as shown clearly in FIG. 1, the flat plate-like portions of the moldboard and/or plowshare are pulled into tight clamped engagement with the foot 20 which is concaved and which has spaced corners that bite into the said plates or so as to deflect them and cause them to bind one against the other. As shown, the means F is an ordinary carriage bolt or the like and nut fastener which can be rigid and manipulated by ordinary tools so as to be tightened. The bolt head, for example, is socketed in the adapter so that it cannot turn, but it is free to drop in or out of placement.

When the concavo-convex disc D is applied to the adapter A, as shown in FIG. 2, the foot 20 is especially effective in fitting to and creating clamped engagement with the disc, said foot 20 being concaved slightly greater than the normal convexity of the disc top.

From the foregoing it will be apparent that I have provided few and simple but effective replaceable elements that form a plow, or the like. The individual wearing elements of the plow can be easily and quickly replaced, or equivalent parts can be substituted when so desired and the plow as a unit can be angularly adjusted. Therefore, the soil tilling implement of the present invention is extremely versatile, being composed of rugged and reliable parts of relatively inexpensive and practical construction.

Having described only typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. An earth tilling implement in the form of a plow, and including:
    (a) an upwardly extending shank,
    (b) an adapter received on the shank and extending upwardly therealong and having a substantially flat foot
    (c) a soil tilling implement engaged flat against the foot and extending upwardly along the adapter,
    (d) a soil tilling implement engaged flat against the first mentioned soil tilling implement and depending away from the foot of the adapter,
    (e) and means securing the two implements together and on the foot.

2. An earth tilling implement in the form of a plow, and including:
    (a) an upwardly extending shank,
    (b) an adapter received on the shank and extending upwardly therealong and having a downwardly faced concaved foot,
    (c) alternately mountable soil tilling implements engageable on the adapter, one a soil tilling implement engaged flat against the foot and extending upwardly along the adapter, and the other an upwardly convexed soil tilling implement fittingly engaged with the concavity of the foot and having a downwardly turned periphery,
    (d) and clamp means to press either of the two said implements onto the concaved foot.

3. An earth tilling implement in the form of a plow, and including:
    (a) an upwardly extending shank,
    (b) an adapter received on the shank and extending upwardly therealong and having a triangular and concaved foot having three depending corners,
    (c) a soil tilling implement with a flat portion to underlie the foot and to engage against each of the corners thereof, and having upwardly extending portions along the adapter,
    (d) a soil tilling implement with a flat portion to underlie and engage the said flat portion of the first mentioned soil tilling implement, and having depending portions,
    (e) and clamp means to press the two said flat portions of the two said soil telling implements together in pressured engagement and in pressured engagement with said corners of the concaved foot.

4. An earth tilling implement in the form of a plow, and including:
    (a) an upwardly extending shank,
    (b) an adapter with a tubular body slidably engaged over the shank and fixed thereto and extending upwardly therealong and having a triangular and concaved foot having three depending corners,
    (c) a soil tilling implement with a flat portion to underlie the foot and to engage against each of the corners thereof, and having upwardly extending portions along the adapter,
    (d) a soil tilling implement with a flat portion to underlie and engage the said flat portion of the first mentioned soil tilling implement, and having depending portions,
    (e) and clamp means to press the two said flat portions of the two said soil tilling implements together in pressured engagement and in pressured engagement with said corners of the concaved foot.

References Cited by the Examiner

UNITED STATES PATENTS

| | | | |
|---|---|---|---|
| 20,790 | 7/1858 | Harris | 172—721 |
| 906,693 | 12/1908 | Cook | 172—744 X |
| 1,268,902 | 6/1918 | West | 172—190 X |
| 2,083,083 | 6/1937 | Neilsen | 172—190 |

FOREIGN PATENTS 906,646   9/1962   Great Britain.

ABRAHAM G. STONE, *Primary Examiner.*

J. R. OAKS, *Assistant Examiner.*